May 12, 1925.
J. S. O'HARA
1,537,183
AGRICULTURAL MACHINE
Filed Jan. 3, 1925
2 Sheets-Sheet 2
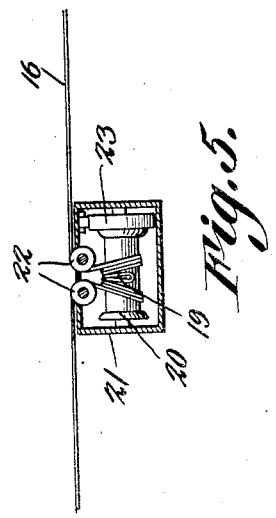
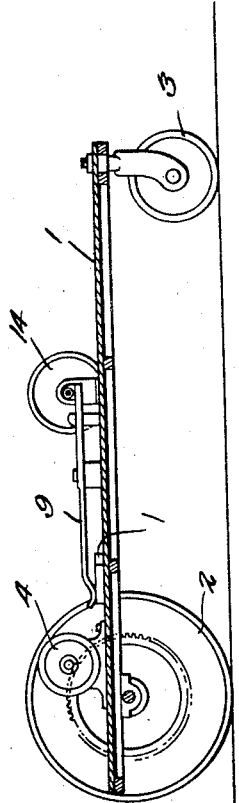
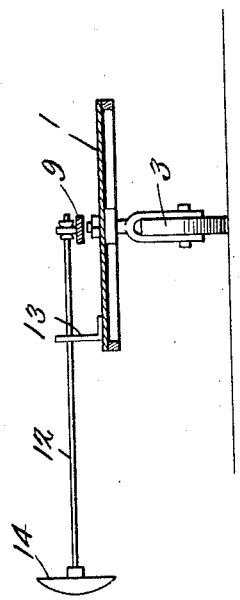
J. S. O'Hara
Inventor,
By C. A. Snow & Co.
Attorneys.

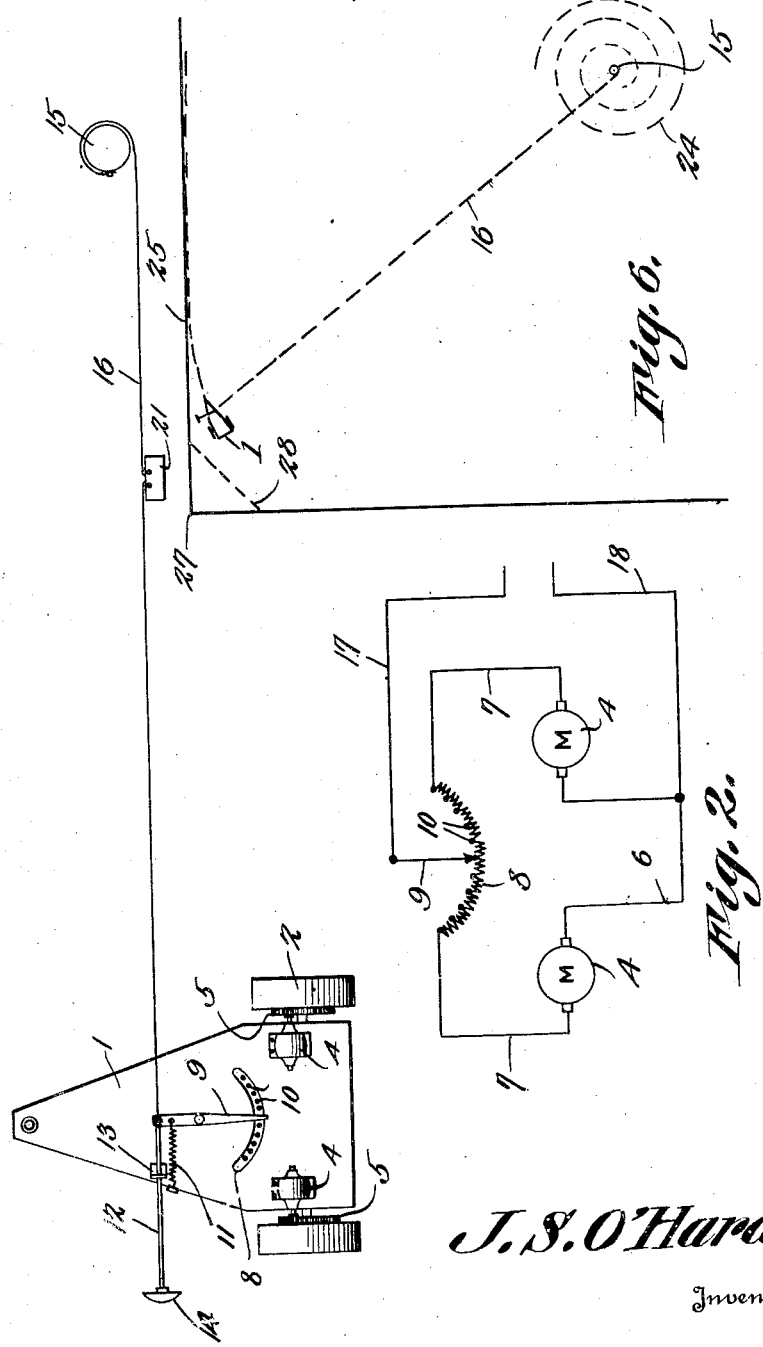

Patented May 12, 1925.

1,537,183

UNITED STATES PATENT OFFICE.

JOSEPH S. O'HARA, OF ROMNEY, WEST VIRGINIA.

AGRICULTURAL MACHINE.

Application filed January 3, 1925. Serial No. 461.

*To all whom it may concern:*

Be it known that I, JOSEPH S. O'HARA, a citizen of the United States, residing at Romney, in the county of Hampshire and State of West Virginia, have invented a new and useful Agricultural Machine, of which the following is a specification.

This invention relates to machines for plowing, cultivating, fertilizing or otherwise treating the soil, one of the objects of the invention being to provide a motor propelled mechanism which can be caused to operate automatically to travel over all portions of the field, the same operating continuously from the time of starting at one point until the entire field has been covered.

A further object is to provide a machine of this character adapted ordinarily to follow a spiral path, means being provided, however, whereby the machine, when brought in close proximity to a fence or other relatively fixed structure, will be deflected automatically out of its ordinary path of travel until the obstruction has been passed.

A still further object is to provide a machine of this type having drive wheels to which are connected independent power mechanism so controlled that the wheels can be operated at different speeds to maintain the machine in the proper path of travel.

A further object is to provide a means whereby power can be supplied continuously to the machine during its operation in a field.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a plan view more or less in diagram showing the machine and its controlling connection.

Fig. 2 is a diagram of the wiring which can be employed where the machine is electrically controlled.

Fig. 3 is a vertical longitudinal section through the machine.

Fig. 4 is a vertical transverse section.

Fig. 5 is a detail view of an automatic tension device or take-up which can be used in connection with the power cable of the machine.

Fig. 6 is a view on a greatly reduced scale showing a portion of a field and some paths which may be followed on the field by the machine while operating automatically.

Referring to the figures by characters of reference 1 designates a tractor structure which, in the present instance, is provided with two power wheels 2 and with a supporting wheel 3 in the form of a caster. Obviously, however, the tractor can be of any other preferred construction provided it will meet the requirements. It is essential that the same be steered readily. In the structure illustrated each of the wheels 2 has an electric motor 4 adapted to transmit motion to the wheel through suitable gearing indicated generally at 5. The two motors operate independently of each other and, as shown particularly in Fig. 2, are electrically connected to each other as at 6 while the said motors are also electrically connected, as at 7, to the respective ends of a rheostat 8.

A lever 9 is fulcrumed on the tractor and one end thereof constitutes means for engaging the respective points or contacts 10 of the rheostat. A spring 11 or other suitable means is provided for holding the lever yieldingly and normally in a predetermined position relative to the rheostat and connected to the lever and extending laterally beyond the tractor is a plunger 12 which, when thrust longitudinally, in one direction, will shift the lever 9 against the action of the restraining means 11. This plunger is mounted in a guide 13 and is provided, at its outer end, with a head 14 of any suitable construction for sliding or rolling contact with any obstruction adjacent the path of the tractor.

In using the machine herein described a pole 15 may be erected at the center of a field. A cable 16 including a power wire 17 and a return wire 18 is suitably secured at one end to this pole while the other end is connected to the lever 9. The power wire 17 of the cable is electrically connected to the lever or to a portion thereof so that current may flow freely from said wire 17 to the contact 10 engaged by the lever. The return wire 18 is electrically connected to the two motors as shown in Fig. 2.

Any suitable means may be employed for taking up slack in the cable 16. For example, and as shown in Fig. 5 a portion of the cable can be looped as at 19 and placed in engagement with a spool 20. This spool is mounted in a housing 21 and opposed portions of the loop engage guide sheaves 22 carried by the housing. A spring 23 serves to hold the loop normally wound about the spool but will be placed under increased tension, when the cable is elongated by pulling it longitudinally.

In using this apparatus, the tractor is placed adjacent the edge of the field where the soil is to be plowed or cultivated, it being understood of course that suitable soil engaging elements are attached to the tractor. The cable 16 is normally taut with the lever 9 preferably in engagement with the middle contact or point of the rheostat. Current may be conducted to and from the pole 15 by any suitable means, the wires employed for this purpose obviously being electrically connected to the respective wires 17 and 18 of the cable. A switch may be provided wherever desired for the purpose of controlling the flow of current to the tractor. When the current is turned on, it will flow through lever 9 to the rheostat and thence past both ends of the rheostat to the respective motors. While the lever is in its normal or central position the power transmitted to both motors will be equal and, consequently, the tractor will tend to travel straight ahead. As the cable 16 is attached to the pole 15, however, the tractor, during its forward movement, will pull upon the cable with the result that lever 9 will be shifted from its normal position toward the left in Figs. 1 and 2. Consequently more power will be directed to the left hand motor than to the right hand motor with the result that the left hand wheel will travel slightly faster than the right hand wheel. Thus the tractor will be caused to travel in a circle. During this travel the cable 16 will be wound about the pole and this, obviously, will result in the tractor following a spiral course about the pole, a portion of this course being indicated by broken lines at 24 in Fig. 6. If the tractor, while pursuing its curved course, should approach a fence or other enclosure, the head 14 of the plunger 12 would press against the enclosure, indicated at 25 in Fig. 6, with the result that the plunger would be pushed to the right and the lever 9 shifted abruptly away from its position so as to direct more power to the left hand wheel and greatly reduce the power directed to the right hand wheel. Consequently the tractor will be caused to turn abruptly and follow a course substantially parallel with the enclosure until the slack, which has been taken up by the spool 20, is paid out at which time the tractor will again travel its curved course, the cable at the same time slowly wrapping about the pole 15.

Mechanism of this kind can be used for cultivating an entire field even though of irregular contour, the spring 11 and cable 16 operating in opposition to each other so as to hold the tractor to its proper course and the movement of the tractor about the pole causing the cable to wind so as to gradually shift the tractor toward the center of the field. Obviously the structure described can be modified in various ways without departing from the spirit of the invention. For example the cable 16 could be utilized as a means for controlling the valves of two motors coupled to the respective wheels, these motors being operated by steam, gas or other fuel.

The means for shifting head 14 so as to cause the tractor to move out of its normal course can be in the form of a strong wire or cable stretched along a field or, as before stated, the fence or other enclosure of the field can serve to deflect the head. With this apparatus and with suitable arrangement of deflecting cables erected at desired points in a field, the tractor can be caused to cover practically every part of the field except the extreme angle portions. For example where a field is provided with a square corner as shown at 27 in Fig. 6, a wire or cable 28 can be strung diagonally across the corner where it will engage the head 14 and cause proper deflection of the tractor when it approaches the corner.

Although the structure has been described as starting close to the edges of the field and working inwardly toward the center, it is to be understood that this operation can be reversed if desired, the tractor starting at the center and gradually working outwardly therefrom.

What is claimed is:—

1. The combination with a tractor having separate propelling wheels, and separate power units for driving the respective wheels, of anchored means connected to the tractor and operated by the tractor while in motion for controlling the operation of the respective power units to propel the tractor along a predetermined path.

2. The combination with a tractor including separate propelling wheels, and separate driving mechanism for the respective wheels, of means for controlling the operation of the respective driving mechanism, and means connected to said controlling means during the movement of the tractor for maintaining said tractor substantially in a predetermined path relative to a fixed point.

3. The combination with a tractor having independently driven propelling wheels and motors for driving the respective wheels, of a power cable leading to the tractor, shiftable means for conducting current from said cable to both motors simultaneously, said means normally positioned to equally distribute current to the motors, means for anchoring the cable at one end, said cable and tractor cooperating, during the movement of the tractor to shift the current conducting means to unequally distribute power to the motors and drive the propelling wheels at different speeds.

4. The combination with a tractor having separate propelling wheels and separate motors for actuating the respective wheels, of a power cable leading to the tractor, means for anchoring the cable at one end, means movably mounted on the tractor and connected to and actuated by the cable for normally distributing power equally to the motors, said cable cooperating with the tractor, while in motion, to shift the power distributing means to propel the wheels at different speeds and to wind the cable about the anchoring means.

5. The combination with a tractor having separate propelling wheels and separate motors for driving the respective wheels, of a power cable, means for anchoring the cable at one end, power distributing means movably mounted on the tractor and connected to and actuated by the cable, yielding means for holding the power distributing means normally in one position to distribute power in predetermined portions to the respective motors, means projecting laterally from the tractor for shifting the power distributing means when the tractor is propelled toward an obstruction at one side thereof, said tractor and cable cooperating to shift the power distributing means to drive one motor faster than the other and normally propel the tractor about the anchoring means.

6. The combination with a tractor having independently operated propelling wheels and motors for driving the respective wheels, of a rheostat connected at its ends to the respective motors, an arm movably mounted and cooperating with the rheostat, yielding means for holding the arm normally in a predetermined position, a power cable connected to the arm and anchored at one end, said cable and tractor cooperating, during the movement of the tractor, to shift the arm out of normal position to distribute currents unevenly to the motors and drive the wheels at different speeds.

7. The combination with a tractor having independently operated propelling wheels and motors for driving the respective wheels, of a rheostat connected at its ends to the respective motors, an arm movably mounted and cooperating with the rheostat, yielding means for holding the arm normally in a predetermined position, a power cable connected to the arm and anchored at one end, said cable and tractor cooperating, during the movement of the tractor, to shift the arm out of normal position to distribute currents unevenly to the motors and drive the wheels at different speeds, said cable, during the operation of the tractor, being adapted to wind upon its anchoring means.

8. The combination with a tractor having independently operated propelling wheels and motors for driving the respective wheels, of a rheostat connected at its ends to the respective motors, an arm movably mounted and cooperating with the rheostat, yielding means for holding the arm normally in a predetermined position, a power cable connected to the arm and anchored at one end, said cable and tractor cooperating, during the movement of the tractor, to shift the arm out of normal position to distribute currents unevenly to the motors and drive the wheels at different speeds, said cable, during the operation of the tractor, being adapted to wind upon its anchoring means, and means connected to the rheostat arm for forcibly shifting it when brought in contact with an obstruction, thereby to vary the distribution of currents to the motors and propel the tractor away from the obstructions.

In testimony that I claim the foregoing as my own, I have hereto affixed my signature in the presence of two witnesses.

JOSEPH S. O'HARA.

Witnesses:
 ETHEL M. BOWMAN,
 H. DONALD BOWMAN.